Feb. 2, 1971  E. A. MAGID  3,560,322
FABRIC-SIMULATING LAMINATED SHEET STRUCTURE
AND METHOD FOR MANUFACTURING THE SAME
Filed Jan. 18, 1968
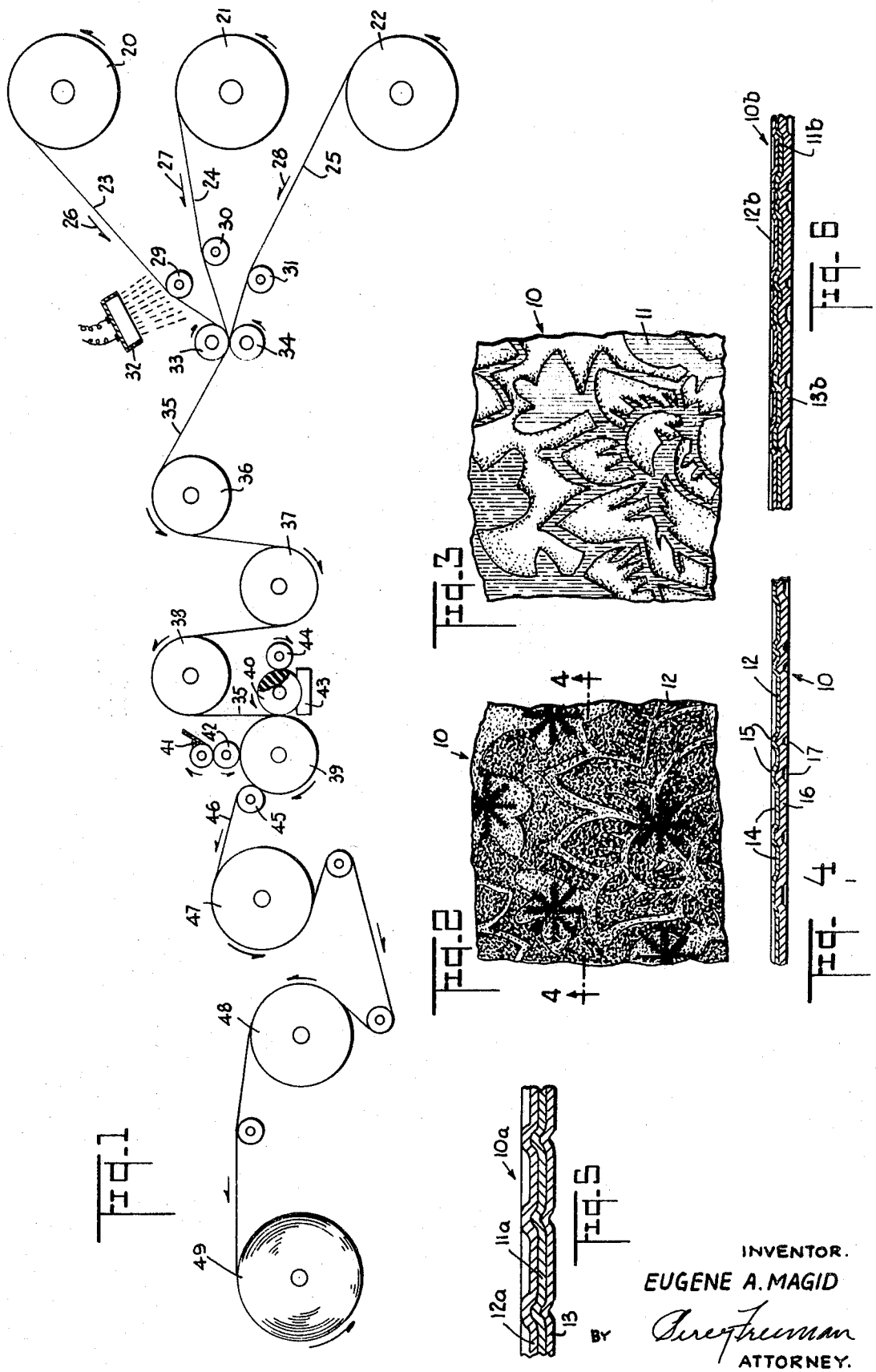
INVENTOR.
EUGENE A. MAGID
BY Percy Freeman
ATTORNEY.

United States Patent Office 3,560,322
Patented Feb. 2, 1971

3,560,322
FABRIC-SIMULATING LAMINATED SHEET STRUCTURE AND METHOD FOR MANUFACTURING THE SAME
Eugene A. Magid, Rydal, Pa. 19046
Continuation-in-part of application Ser. No. 383,567, July 20, 1964. This application Jan. 18, 1968, Ser. No. 716,252
Int. Cl. B32b 5/00
U.S. Cl. 161—120
1 Claim

ABSTRACT OF THE DISCLOSURE

A fabric-simulating, laminated sheet structure and a method for manufacturing the same. The sheet structure includes at least two layers of thermoplastic sheet material which are coextensively bonded together to form an interface therebetween, with one of these layers having an elasticity which is substantially less than that of the other of the layers so that this one layer forms a carrier layer for the other layer. The other layer is a foam plastic which forms a covering layer for the carrier layer, and the bonded layers are embossed with a multiplicity of registering depressions and projections distributed throughout the layers to provide the foam plastic cover layer at its exterior surface which is directed away from the one carrier layer with a texturized velvety appearance and feel. These thermoplastic layers are initially at least temporarily bonded to each other at their interface under heat and pressure, and then after preheating the bonded layers are embossed with an engraved embossing roll which provides the multiplicity of depressions and projections distributed throughout the layers, this embossing taking place when the thermoplastic layers have a temperature sufficiently high to retain the registering embossed projections and depressions in the layers.

CROSS REFERENCE TO RELATED APPLICATION

This application is a continuation-in-part of copending application Ser. No. 383,567, filed July 20, 1964 and entitled "Simulated Fabric and Method of Making Same," now abandoned.

BACKGROUND OF THE INVENTION

The invention relates to a fabric-simulating sheet structure and a method for manufacturing the same.

It is known at the present time to provide fabrics which are woven or knitted from yarns made of natural fibers such as fibers of cotton or wool. It is also known to provide fabrics knitted or woven from yarns composed of synthetic fibers. It is also known to provide non-woven fabrics composed at least in part of a synthetic plastic sheet material to which synthetic or natural fibers may be bonded, for example.

All of these known structures are relatively expensive, and while extremely inexpensive plastic sheet material is known, attempts to convert such plastic sheet material into a non-woven structure simulating a fabric have not been successful. With these known structures the cold touch of plastic sheet material cannot be eliminated, and it has not been possible to achieve the soft texture and feel of a true fabric.

SUMMARY OF THE INVENTION

It is accordingly a primary object of the present invention to provide a fabric-simulating sheet structure which is non-woven and composed of thermoplastic sheet material and which will have at its exterior the appearance and feel of a true fabric.

A further object of the present invention is to provide a fabric-simulating sheet structure which will have the soft non-crinkling flexibility of a true fabric with a matted, non-glossy textured exterior surface difficult to distinguish from the appearance and feel of a true fabric.

In addition it is an object of the invention to provide a fabric-simulating sheet structure which can be readily decorated with any desired coloration and imprinting of decorative patterns and the like.

Also, it is an object of the invention to provide a method of manufacturing a fabric-simulating sheet structure from extremely inexpensive thermoplastic sheet material in an extremely inexpensive manner which will enable the fabric-simulating structure of the invention to be produced at a small fraction of the cost of true fabrics while closely simulating the characteristics of a true fabric and even having some highly desirable characteristics which are not present in a true fabric.

Furthermore, the objects of the present invention include the provision of a method of manufacture which can be carried out in a fully continuous manner during which all of the required manufacturing steps are carried out so that starting from the initial sheet material all the way to the finished fabric structure all of the steps can be performed continuously with the finished fabric structure being continuously produced from a continuous supply of the initial sheet structure.

In accordance with the invention the fabric-simulating sheet structure is laminated and includes at least two coextensive layers of thermoplastic sheet material which are bonded to each other to form an interface therebetween with one of these layers having substantially less elasticity than the other of the layers and forming a carrier layer therefor while the other layer is a foam plastic covering layer, the bonded layers being embossed with a multiplicity of registering depressions and projections distributed throughout the layers and providing the foam plastic covering layer with an exterior velvety textured surface having the appearance and feel of a true fabric.

According to the method of the invention the thermoplastic layers are bonded together to form the interface therebetween and they are simultaneously embossed with the registering multiplicity of depressions and projections while at a temperature sufficiently great to receive the embossed depressions and projections therein.

BRIEF DESCRIPTION OF DRAWINGS

The invention is illustrated by way of example in the accompanying drawings which form part of this application and in which:

FIG. 1 is a schematic representation of the method of the present invention for manufacturing the sheet structure of the present invention;

FIG. 2 is a fragmentary illustration of the sheet structure of the invention when looking toward a surface thereof;

FIG. 3 is a fragmentary illustration of the sheet structure of FIG. 2 as it appears when looking toward that surface of the sheet structure which is opposed to that which is shown in FIG. 2;

FIG. 4 is a fragmentary transverse section taken along line 4—4 of FIG. 2 in the direction of the arrows;

FIG. 5 is a sectional elevation of another embodiment of a sheet structure according to the invention; and FIG. 6 is a fragmentary sectional illustration of yet another embodiment of a sheet structure according to the invention.

DESCRIPTION OF PREFERRED EMBODIMENTS

Referring now to the drawings and first to FIGS. 2–4, the fabric-simulating laminated sheet structure 10 of the present invention which is illustrated therein includes two layers 11 and 12 of thermoplastic sheet material which are coextensive and which are bonded together to form an interface therebetween. The layer 11 has substantially less elasticity than the layer 12 and forms a backing or carrier layer for the other layer 12 which is in the form of a foam plastic. The carrier layer 11 is a thermoplastic film of polyethylene or vinyl such as polyvinyl chloride, and it has a thickness of between 0.25 mil and 30 mil, although the thickness of the carrier layer 11 may be as great as 62.5 mil, if desired. The foam plastic layer 12 may be polyurethane, polyvinyl chloride, or any other thermoplastic foam, and initially it may have a thickness of between 1/64 inch and 1 inch. In the finished sheet structure, however, the foam plastic layer 12 has a thickness which is not substantially different from the thickness of the carrier layer and which may in fact be of a thickness less than that of the carrier layer, as illustrated in FIG. 4. While the foam plastic layer may initially be substantially opaque, in the finished sheet structure the layer 12 is thin enough to have sufficient transparency to render the surface of the carrier layer 11 at the interface between layers 11 and 12 clearly visible so that any decorative printing or the like on the carrier layer 11 at the interface between the layers 11 and 12 will be visible through the foam plastic layer 12. In the finished sheet structure the foam plastic layer has very little of the easy yieldable elastic compressibility commonly associated with foam plastic and instead provides the finished sheet structure with a matted non-glossy exterior surface at the layer 12 having a velvety textured surface giving the appearance and feel of a true fabric. The bonded layers 11 and 12 are preferably directly fused to each other under heat and pressure so that there is no adhesive required for bonding the layers to each other, although a suitable adhesive may be used in some cases, if desired, and the bonded layers are embossed in their bonded condition and at a temperature sufficiently great to deform and permanently impart to the layers the multiplicity of depressions and projections distributed throughout the layers and resulting from the embossing thereof. Because the layers are simultaneously embossed in their bonded condition, the depression and projections of one layer register with those of the other layer providing the foam layer 12 with depressions 14 registering with flat projections 16 of the carrier layer 11 and providing the foam layer 12 with substantially flat projections 15 registering with depressions 17 of the carrier layer 11. Thus, the embossing of the bonded layers contributes to the textured velvety feel and appearance of the finished sheet structure of the invention.

With or without decorative printing on the surface of layer 11 which is bonded to layer 12 and which is visible therethrough, it is possible to provide at the exterior surface of the layer 12 additional printing so as to provide a simulated appearance of a patterned fabric, and the printed portions at the exterior surface of the layer 12 may register with the embossing thereof. Thus, referring to FIG. 2 which shows how the finished structure appears when looking at the outer foam plastic layer 12, the dark areas of FIG. 2 which have the decorative appearance of enlarged flowers are directly printed on the exterior surface of the layer 12, while the decorative patterns of lesser darkness in FIG. 2 represent decorative printing on the surface of carrier layer 11 at the interface between the layers visible through the layer 12 which provides the finished structure with a matted, non-glossy exterior having a velvety soft texture. On the other hand, the exterior surface of layer 11 which is visible in FIG. 3 forms the back surface of the finished structure and retains the appearance and feel of the plastic film.

In the embodiment of the invention which is illustrated in FIG. 5 the thermoplastic layer 11a corresponds to and may have the same structure as the layer 11 of FIGS. 2–4 while the upper foam plastic layer 12a of FIG. 5 corresponds to the foam plastic layer 12 described above and in the example of FIG. 5 is shown as having approximately the same thickness as the layer 11a. These layers 11a and 12a are joined together in the same way as the layers 11 and 12 of FIGS. 2–4 and have all of the above-described characteristics of the structure of FIGS. 2–4. However, in the embodiment of FIG. 5 there is a third layer 13 substantially identical with the foam plastic layer 12a and bonded in the same way to the intermediate carrier layer 11a which is thus sandwiched between the foam plastic layers 12a and 13. Thus, the construction of FIG. 5 may be provided by simultaneously bonding the three layers to each other under heat and pressure so that they are directly fused to each other, and then the thusly bonded layers are simultaneously embossed to provide the registering multiplicity of projections and depressions which are distributed throughout the layers. The foam plastic layer 13 may be treated at its exterior surface in the same way as the layer 11 so as to have any decorative patterns printed thereon and also the surface of the intermediate carrier layer 11a which is directed away from the upper layer 12a will be visible through the lower foam plastic layer 13 even though the latter initially may have been of a sufficient thickness to be relatively opaque. Thus, with the construction of FIG. 5 the finished fabric will have at its opposed exterior surfaces the same texture, feel, and appearance as the exterior surface of layer 12 of FIGS. 2–4.

In the embodiment of FIG. 6 there is an intermediate carrier layer 11b which is sandwiched between the foam plastic layers 12b and 13b to provide the fabric structure 10b which differs from the fabric structure 10a of FIG. 5 only in that the foam plastic layer 13b has a thickness greater than that of the foam plastic layer 12b, thus providing with the structure of FIG. 6 a fabric simulation on one side of the structure 10b which is different from that on the other side of the structure 10b. Thus, with both of the embodiments of FIGS. 5 and 6 the intermediate layer 11a or 11b will have an elasticity which is substantially less than that of the outer foam layers and will be directly fused thereto under heat and pressure, while the thus-bonded layers are in both cases simultaneously embossed to be provided with the registering multiplicity of depressions and projections distributed throughout the layers.

A method of the present invention for manufacturing a sheet structure such as the structure 10a or 10b is illustrated in FIG. 1. A plurality of supply rolls 20, 21, and 22 are provided to supply a foam plastic web 23 from the supply roll 20, a relatively inelastic carrier film 24 from the supply roll 21, this film 24 being plain or decorated, and a third foam plastic web 25 is provided from the supply roll 22. The webs 23–25 are respectively continuously fed in the directions indicated by the arrows 26–28 over guide rolls 29–31, respectively, which may be heated for raising the temperatures of the webs 23–25, respectively. However, instead of or in addition to heating of the rolls 29–31 it is possible to heat the webs by way of a radiant heating means 32 diagrammatically illustrated in FIG. 1.

From the guide rolls 29–31, the three webs 23–25 are compressed against each other between a pair of pinch rolls 33 and 34 with a pressure which is sufficient to achieve for the heated webs at least temporary fusing or bonding thereof to each other with the relatively non-elastic film 24 having at one side a bonded interface where the foam plastic web 23 is fused thereto and at its other side a bonded interface where the foam plastic web 25 is fused thereto. In this way there will issue from the pinch rolls 33 and 34 a laminated sheet structure 35. In this laminated sheet structure 35 the three webs are already fused together to form a multi-play sheet structure.

This laminated sheet structure 35 which is thus continuously derived from the supply rolls 20–22 is continuously delivered to an engraved embossing roll 39 after passing around one or more heated rolls 36–38 which serve to preheat the laminated sheet structure 35 to a temperature sufficiently great to enable the thermoplastic sheet structure to retain the multiplicity of depressions and projections resulting from the embossing at the embossing roll 39. The laminated sheet structure 35 passes between the embossing roll 39 and a back-up or impression roll 40, so that the engraved embossing roll 39 will be capable of embossing a multiplicity of depressions and projections in the laminated sheet structure as the latter passes between the rolls 39 and 40. In this way the layers are permanently laminated and the entire structure is texturized.

In the example illustrated in FIG. 1, a printing ink or decorative coating material is situated in an ink fountain 41 to be fed therefrom to a transfer roll 42 which applies the liquid ink to the exterior surface of the embossing roll 39 to be situated at the outer ends of the projections thereof, and since these projections directly engage the exterior surface of web 23 which is directed away from the carrier layer 24, the printing ink or the like is applied directly to the interior depressed portions at the exterior surface of the foam layer 23 thus providing "valley-printing" simultaneously with the embossing of the sheet structure.

In order to lubricate the roll 40 and limit the extent to which the backing roll 40 retains heat from the webs, this backing or impression roll extends into a liquid bath 43 and a suitable squeegee roll 44 coacts with the impression roll 42 to move liquid therefrom.

The finished sheet structure 46, which is still in a heated condition, is then guided from the embossing roll 39 around a guide roll 45 to cooling rolls 47 and 48 around which the sheet structure passes in the manner indicated in FIG. 1, so that the sheet structure will cool and set in its embossed condition retaining all of the multiplicity of depressions and projections which are distributed throughout the sheet structure. The finished sheet structure is then taken up on a suitable take-up roll 49.

The heating of heating means 36–38 for preheating of the thermoplastic sheet material just prior to the embossing thereof is at a temperature of between 150° F. and 600° F. depending upon the particular plastic sheet material just entering the embossing nip, although the preheating temperature can be substantially higher if desired.

The embossing pressures will depend upon the thickness of the materials and upon the particular type of material, and while all of the layers of sheet material will be thermoplastic, nevertheless the embossing pressure will depend upon the number and nature of the plies that pass simultaneously through the embossing nip. Generally speaking, however, the embossing pressures with the thermoplastic sheet material used to form the layers of the sheet structure of the invention will range anywhere from 2 tons to 25 tons.

The speed with which the sheet material progresses through the apparatus of FIG. 1 many range from 4 yards per minute all the way up to 90 yards per minute.

The foam plastic sheet material will initially have a thickness generally of from 3/64 inch to 1½ inch, although in this case also it may be desirable with some applications to start with a foam plastic which may have a thickness outside of this general range.

The substantially non-elastic plastic film which forms the carrier layer for carrying the foam plastic may have a thickness ranging from 0.25 mil to 62.5 mils.

The following are specific examples of the method of the invention which were carried out to provide the sheet structure of the invention:

Example I

In order to form the structure shown in FIGS. 2–4 and described above, the carrier layer 11 was in the form of a polyvinyl chloride film having a thickness of 6 mils, while the foam plastic layer 12 was polyurethane having initially a thickness of 9/64 inch. These layers of sheet material were taken from supply rolls such as the rolls 20 and 21 of FIG. 1 where the roll 20 formed an opaque polyurethane foam layer and the roll 21 provided the polyvinyl chloride film carrier layer. Just before reaching the embossing roll 39 these layers were heated by rolls 36–38 at approximately 375° F., and they were then embossed at a pressure of 15 tons at the embossing nip. The sheet material was fed through the apparatus of FIG. 1 at a speed of approximately 12 yards per minute. With this particular example the structure of FIGS. 2–4 was provided with the final thickness of the foam plastic covering layer being slightly less than that of the polyvinyl chloride carrier layer, as indicated in FIG. 4. The printing shown by the darkened areas in FIG. 2 was applied directly to the exterior surface of the foam plastic covering layer. The structure 41, 42 was used so that "valley-printing" by way of the embossing roll 39 itself was resorted to. However, that face of the carrier layer 11 which was directed toward and fused with the foam plastic layer carried decorative printing which became visible through the foam plastic in the finished structure, as indicated in FIG. 2.

Example II

A two-layer sheet structure was also made in a manner similar to that described above in connection with Example I, except that in this case the foam plastic which also was polyurethane initially had a thickness of 5/64 inch, while the carrier layer took the form of a polyethylene film having a thickness of 2 mils. In this case the fused sheets were preheated to a temperature of 260° F. just prior to the embossing, and the embossing pressure was also 15 tons. However, the speed of movement of the sheet material was approximately 25 yards per minute. Thus, in this case the resulting sheet structure was thinner than that derived from Example I and the foam plastic in the finished structure was slightly thicker than the polyethylene carrier film.

Example III

A triple-ply sheet structure was manufactured according to the invention by directing through the structure of FIG. 1 a foam plastic sheet 23 of polyurethane having a thickness of 5/64 inch, a polyethylene film 24 having a thickness of 2 mils, and a foam plastic sheet 25 also of polyurethane and also having an initial thickness of 5/64 inch. These three sheets were treated precisely as described above in connection with FIG. 1, and they were preheated with rollers 36–38 at a temperature of approximately 375° F. just prior to entering the embossing nip between the rolls 39 and 40. The embosing pressure in this case also was 15 tons, and the speed of movement of the sheet structure was approximately 20 yards per minute. This example resulted in a structure as shown in FIG. 5 where all of the layers in the final structure have approximately the same thickness.

It is to be noted that with all of the examples the final resulting sheet structure of the invention had the soft flexibility of a true fabric while the exterior surfaces of the foam plastic covering layers had a textured velvety feel and appearance of a true fabric.

It is also to be noted that while reference has been made above to substantially non-elastic carrier layers of plastic film, the carrier layer may also be of a reticulated or net-type material so as to provide not only a suitable backing for the foam plastic layers but also so as to provide additional contour structure therefor. This is particularly true for a triple-ply sheet structure where a reticulated, net-type of carrier layer will be situated between a pair of foam plastic covering layers which actually become fused to each other through the openings of the carrier layer in this case.

As has been indicated above, decorative printing or the like may be applied directly to the exposed surface of the foam plastic covering layers.

The term "fabric" is intended to refer to all knitted, netted and textile fabrics, as well as to substitutes therefor.

What is claimed is:

1. In a fabric-simulating, laminated sheet structure, the combination of:
   (A) a carrier layer of relatively inelastic, thermoplastic, sheet material,
      (1) said carrier layer having a top, interface surface;
   (B) a first decorative pattern imprinted upon the said top, interface surface;
   (C) a foam plastic layer bonded to the said top, interface surface over the said first decorative pattern,
      (1) said foam plastic layer being compressed from an initial width having a first thickness to a final width having a reduced thickness,
         (a) said foam plastic layer being substantially opaques when in the first thickness,
         (b) said foam plastic layer being sufficiently transparent when compressed to the reduced thickness to render the said first decorative pattern visible therethrough,
      (2) said foam plastic layer having a top surface;
   (D) a multiplicity of depressions and projections distributed throughout the said bonded carrier and foam plastic layers,
      (1) said depressions and projections being randomly positioned to simulate the appearance of a patterned fabric;
      (2) said depressions and projections being formed in the said foam plastic top surface,
         (a) said depressions and projections forming a plurality of depressed areas and projected areas in the said foam plastic top surface; and
   (E) a second decorative pattern positioned within the said foam plastic depressed areas,
      (1) said second decorative pattern overlying the said first decorative pattern, whereby a composite sheet of textured feel and appearance is produced.

References Cited

UNITED STATES PATENTS

| | | | |
|---|---|---|---|
| 2,878,153 | 3/1959 | Hacklander | 161—120 |
| 3,170,832 | 2/1965 | Wilson et al. | 161—160X |
| 3,244,571 | 4/1966 | Weisman | 161—124X |
| 3,256,131 | 6/1966 | Koch et al. | 161—119 |
| 3,257,263 | 6/1966 | Miller | 161—119 |
| 3,050,432 | 8/1962 | Weinbrenner et al. | 161—Isoc. Dig. |
| 3,193,441 | 7/1965 | Schafer | 161—Isoc. Dig. |

WILLIAM J. VAN BALEN, Primary Examiner

R. O. LINKER, JR., Assistant Examiner

U.S. Cl. X.R.

156—209, 220, 227; 161—124, 138, 160